United States Patent
Thomaides et al.

[19]

[11] Patent Number: 5,948,146
[45] Date of Patent: Sep. 7, 1999

[54] HYDROENTANGLED FLUOROPOLYMER FIBER BED FOR A MIST ELIMINATOR

[75] Inventors: Lazarus Thomaides, North Wales; Richard P. Brookman, Erwinna; Steven I. Taub, Narberth, all of Pa.

[73] Assignee: Ceco Filters, Inc., Conshohocken, Pa.

[21] Appl. No.: 08/987,064

[22] Filed: Dec. 8, 1997

[51] Int. Cl.⁶ .......................... B01D 46/00; B01D 39/16
[52] U.S. Cl. .................. 95/273; 55/498; 55/528
[58] Field of Search .............. 55/528, 498, 502, 55/DIG. 17, 522, 521; 96/189; 95/273

[56] References Cited

U.S. PATENT DOCUMENTS

| | | | |
|---|---|---|---|
| 3,986,851 | 10/1976 | Grodek | 55/528 |
| 4,025,679 | 5/1977 | Denny | 55/528 |
| 4,144,040 | 3/1979 | Claes et al. | 55/498 |
| 4,557,955 | 12/1985 | Walch et al. | 55/528 |
| 4,818,257 | 4/1989 | Kennedy et al. | 55/498 |
| 4,838,903 | 6/1989 | Thomaides et al. | 55/498 |
| 5,028,465 | 7/1991 | Kinsley, Jr. | 428/36.3 |
| 5,045,094 | 9/1991 | Paranjpe | 55/528 |
| 5,198,294 | 3/1993 | Masuda et al. | 55/528 |
| 5,380,580 | 1/1995 | Rogers et al. | 428/219 |
| 5,415,676 | 5/1995 | Tokar et al. | 55/498 |
| 5,422,159 | 6/1995 | Fagan | 428/131 |
| 5,472,481 | 12/1995 | Jones et al. | 55/528 |
| 5,480,547 | 1/1996 | Williamson et al. | 210/533 |
| 5,605,748 | 2/1997 | Kennedy et al. | 55/528 |
| 5,660,607 | 8/1997 | Jokschas et al. | 55/502 |
| 5,730,786 | 3/1998 | Taub | 55/528 |
| 5,795,369 | 8/1998 | Taub | 55/498 |

OTHER PUBLICATIONS

Ausimont USA, "HALAR MBF" (technical data; sales brochure) 1996.

Wadsworth, L. and Fagan, J. "Melt Blown Processing and Characterization of Fluoropolymer Resins" reprinted from *INDA Journal of Nonwovens Research* (Fall 1992).

*Primary Examiner*—Duane S. Smith
*Attorney, Agent, or Firm*—Seidel, Gonda, Lavorgna & Monaco, PC

[57] ABSTRACT

A fiber bed for a fiber bed mist eliminator for removing aerosols and colloidal solids from a gaseous stream is provided having at least one non-woven sheet of hydroentangled ethylene/chlorotrifluoroethylene copolymer fibers.

7 Claims, 5 Drawing Sheets

HYDROENTANGLED FLUOROPOLYMER FIBER BED FOR A MIST ELIMINATOR

FIELD OF THE INVENTION

The invention relates to improved fiber bed separation media for the separation of liquid and solid phase components from aerosols and mists, and a method for using same. More particularly, it relates to a fiber bed mist eliminator wherein the fiber bed media comprises hydroentangled fluoropolymer fibers.

BACKGROUND OF THE INVENTION

It is often required to separate and remove suspended particulates from an aerosol or mist in an industrial process stream. The particulates may be solid or liquid dispersions ranging from submicron to micron-level sizes. Examples include the separation of sulfuric acid mists from acid manufacturing streams or plasticizer mists from the manufacture of polyvinyl chloride products. Solid aerosols, such as smoke, are also candidates for separation.

Fiber bed mist eliminators have found wide industrial application in the removal of aerosols or mists from gas streams. These process streams usually contain particles smaller than about 3 microns. It is generally known that fibers made of various materials may be utilized to construct fiber beds for fiber bed mist eliminators. Fiber bed mist eliminators may achieve separation efficiencies of 99% or greater.

In practice, a gas stream containing a mist or aerosol is directed through a fiber bed. Mist particles coming into contact with individual fibers are collected thereon. Mist particles then coalesce into droplets or a fine liquid film. Liquid is forced through the bed toward the downstream portion of the fiber bed by the continuous gas stream wherein gravity urges the liquid to drain downward. The liquid is collected from the bottom of the unit and the affluent gas stream exits from the top. Solid particles may be similarly removed by the introduction of an atomized liquid into the gas stream prior to entry into the mist eliminator. The atomized liquid dissolves the solid particles and irrigates the fiber bed.

The engineering and economic goal of an efficient fiber bed mist eliminator is to maximize the removal of the liquid or solid component of the gas stream while minimizing the cost of doing so. Such variables as fiber bed geometry, thickness, density (or void fraction), effective surface area, fiber material, and process stream velocity, volume, and composition all have an effect on the pressure drop across the fiber bed. Maintenance of larger pressure drops are energy intensive and therefore more expensive. Similarly, replacement of a fiber bed can be costly due to process down time and capital outlay for new fiber beds.

In an effort toward lowering the pressure drop across the fiber bed, and/or increasing the lifetime of the fiber bed, a designer may try decreasing the fiber bed thickness or expanding the void fraction of the fiber bed by altering the fiber bed material or altogether changing fiber composition. These trade-offs usually come at the expense of lowered separation efficiencies. Thus, there is always a need for an improved fiber bed medium that enables high separation efficiency at satisfactorily low costs.

The fibers which comprise fiber beds have been made from a variety of materials. The materials includes metals (e.g., stainless steel) and glass. Fibers of polymeric materials such as polyester, polyvinyl chloride, polyethylene, and the like have also earned acceptance. The choice of material may depend upon the temperature and/or corrosivity of the process stream, as well as the physical and structural properties of the fiber bed comprised of the constituent material. Designers are therefore concerned with a fiber's diameter, its bulk density, fiber bed surface area, void fraction and behavior in a "wet" or liquid-laden state during the mist eliminator application. Alteration of any of these variables can greatly influence the overall efficiency of the mist eliminator.

Polymer fiber bed media has been traditionally produced via conventional extrusion or melt-blown methods. The resulting polymer is formed into a sheet or webbed mat. Woven fabrics are also employed. The fabrics may be pleated or calendared for increased fiber bed surface area, stress, or mechanical stability. However, most commercially available synthetic materials are limited in their application because their resistivity to chemical degradation is insufficient in many solvent-containing or corrosive process streams.

The largest industrial application for fiber bed mist eliminators is the removal of sulfuric acid from acid-manufacturing streams. Currently, mist eliminators largely employ fiberglass fiber beds in this application. Some fiberglass exhibits excellent chemical resistance to corrosive acidic mists and successfully operates over a wide temperature range. However, fiberglass slowly dissolves over time due to hydrolytic attack from water. Fiberglass is also attacked by ammonia dissolved in water and consequently fails in ammonia-water process streams. Some fiberglass is not effective under caustic (pH>9) conditions. Thus, fiberglass can be unattractive for many fiber bed filtration applications.

There is a need for fiber bed separation media that increases the separation efficiency of a fiber bed mist eliminator, while lowering the operating costs of the separation. An improved fiber bed material should also accommodate a wide range of process stream constituents, including acids, caustics and other corrosives. A fiber bed separation media is needed that is further resistant to the hydrolytic effects of water and which lends itself to surface area-improving designs.

SUMMARY OF THE INVENTION

A fiber bed separation media is provided that lowers the operating costs of a separation and maintains equivalent or superior separation efficiency to that of currently available separation media for a fiber bed mist eliminator.

A fiber bed mist eliminator filter is provided. The fiber bed mist eliminator filter comprises a fiber bed separation media contained within a support structure. The fiber bed separation media comprises at least one layer of non-woven ethylene/chlorotrifluoroethylene copolymer fibers wherein the ethylene/chlorotrifluoroethylene copolymer fibers are hydroentangled.

A fiber bed mist eliminator assembly of the present invention comprises a filter vessel and one or more fiber bed mist eliminator filters. The filter vessel has an inlet and an outlet, the inlet adapted to direct a process stream containing an aerosol into the vessel. The outlet is adapted to direct a substantially aerosol-free gas stream out of the vessel. The vessel is adapted to direct a gas stream flow from the inlet to the outlet. The fiber bed mist eliminator filter is contained within the enclosed filter vessel and positioned between the inlet and the outlet within the flow of the process stream. The fiber bed mist eliminator filter comprises at least one layer of non-woven ethylene/chlorotrifluoroethylene copolymer fibers, wherein the ethylene/chlorotrifluoroethylene copolymer fibers are hydroentangled.

A mist elimination process for the substantial removal of aerosols entrained in a moving process stream is also provided. The process comprises the steps of introducing the moving process stream containing an aerosol into a fiber bed mist eliminator filter and passing the process stream containing an aerosol through a hydroentangled ethylene/chlorotrifluoroethylene copolymer fiber bed separation media in the fiber bed mist eliminator filter to produce a treated gas. The process also requires the collection of liquid concurrently separated from the process stream.

DETAILED DESCRIPTION OF THE INVENTION

Figure 1:
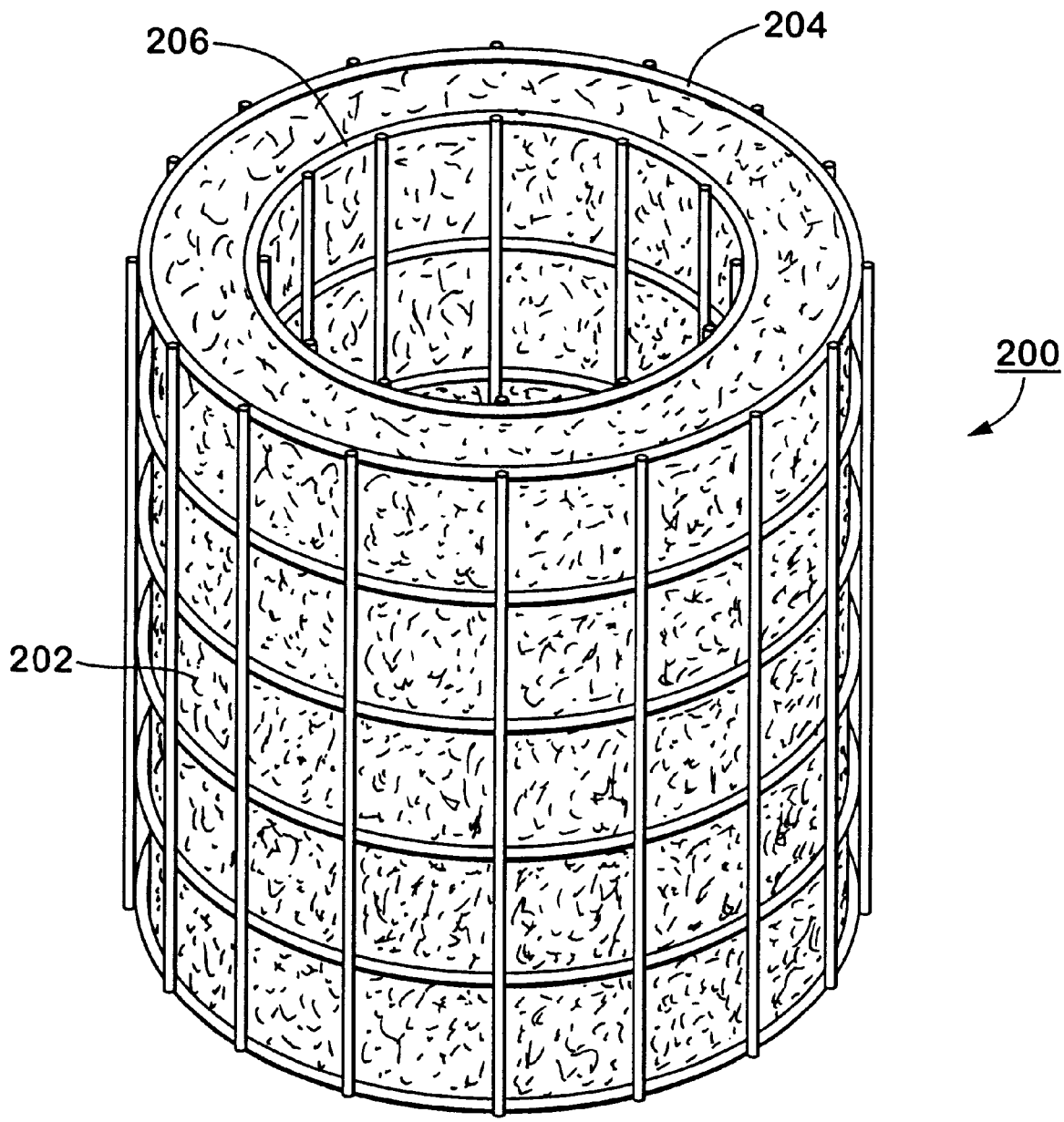
FIG. 1 is a perspective view of a fiber bed mist eliminator filter, particularly showing hydroentangled ECTFE copolymer filter media and its associated support structure.

In many industrial situations, it is desirable to provide a filtering system capable of removing airborne particles. These particles may be either solid or liquid. Aerosols of this nature typically have a particle size of less than 10 microns, more commonly less than 3 microns. Fiber bed filtering systems are commonly used to remove aerosols from gas streams due to their high efficiency. Typically, a plurality of fiber bed filters are employed for this purpose within a common treatment vessel. A multitude of process gas streams containing aerosols are usually introduced into the common treatment vessel.

Recent attention has be paid to the development of halopolymers, or specifically, fluorohalopolymer, fibers as a practical material from which to construct sheets or webs in filter applications. Fluoropolymers offer exceptional properties, as they are chemically inert and resist attacks from highly corrosive chemicals and solvents. Fluoropolymers are effectively used in a broad temperature range from cryogenic levels to about 350° F. (175° C.) and maintain their properties upon exposure to heavy doses of radiation. A particularly effective fluoropolymer for a wide range of applications is ethylene/chlorotrifluoroethylene copolymer (ECTFE). An example of a commercially available melt blown fiber web made from ECTFE copolymer fibers is HALAR MBF from Ausimont, U.S.A. By "ECTFE copolymer" is meant a polymer formed of ethylene and chlorotrifluoroethylene monomers, and optionally one or more further comonomers which contribute less than 15% to the overall molecular weight of the copolymer. Thus, "ECTFE copolymer" as used herein is meant to include not only true copolymers (formed of two monomers) but also terpolymers and higher polymers which include ethylene and trichlorofluoroethylene units, provided the ethylene and trichlorofluoroethylene units comprise at least 85% by weight of the polymer.

The present invention improves upon the conventional fiber mist eliminator systems by providing a more efficient fiber bed mist eliminator filter which includes a separation filter media (or fiber bed) which is hydroentangled. Advantageous properties can be imparted to a collection of non-woven polymeric fibers through the process of hydroentangling. A hydroentangled polymeric web is formed initially by forming a sheet or web of the polymer fibers by a conventional method, such as melt-blown extrusion. The sheet or web is then subjected to hydroentanglement. In the hydroentanglement process, the sheet or web is contacted with a plurality of water jets at high pressure. The contacting of the sheet with high pressure water jets entangles and distributes the fibers in the sheet or web, thereby providing for a more homogenous distribution of fibers. Upon hydroentanglement, the subject fibers become increasingly interlocked with one another. As used herein, a "hydroentangled" material refers to a material having undergone a hydroentangling process substantially as described above.

The improved fiber bed mist eliminator filter is most advantageously positioned in the immediate vicinity of an aerosol generating source. A plurality of improved fiber bed mist eliminator filters may be provided throughout a facility, either individually or in a parallel configuration so as to define an overall fiber bed mist eliminator system.

For the sake of clarity, the combination of the hydroentangled ECTFE copolymer filter media and its associated support structure will be referred to as the fiber bed mist eliminator filter. The combination of the fiber bed mist eliminator filter and the housing/vessel within which it is contained will be referred to as the fiber bed mist eliminator assembly. The untreated gas stream will be generally referred to as a process stream containing an aerosol. The treated gas stream will be generally referred to as substantially aerosol-free gas stream or decontaminated stream. Those skilled in the art will readily appreciate and understand the language utilized throughout this specification.

Referring to FIG. 1, a fiber bed mist eliminator filter is generally shown by the numeral 200. The fiber bed mist eliminator filter 200 includes a bed of hydroentangled ECTFE copolymer filter media 202 and a support structure. The support structure preferably includes an outer cage 204 and an inner cage 206. The support structure 204, 206 contains and supports the filter media 202. The cages 204, 206 can be made from any suitable material which is capable of supporting the fibers of hydroentangled ECTFE copolymer filter media 202 in a substantially stationary position. It is preferred that the material from which the cages 204, 206 are manufactured is inert relative to the process stream and aerosols contained therein. Examples of suitable materials from which the cages 204, 206 can be prepared include, but are not limited to, plastic, metal, and/or mixtures thereof. The fiber bed mist eliminator filter 200 may contain end caps (not shown) that enclose the hollow in the filter formed by the support cages. The end caps are of conventional construction. The fiber bed media 202 may also be secured to the support structure with bands (not shown) that wrap around the circumference of the support structure.

Although the fiber bed mist eliminator filter 200 illustrated in FIG. 1 is generally cylindrical, any desired cross-sectional configuration may be employed. Since the flow velocity of the process stream is relatively low in a fiber bed mist eliminator system, the collection of the particles is generally governed by brownian movement. Hence, the increased thickness of the fiber bed is needed in order for the liquids/aerosols within the gas stream to coalesce into large droplets on and within the filter media. A filter media with this excessive thickness cannot be easily fabricated by folding or creasing the filter media. However, as described more fully below, the hydroentangled ECTFE copolymer filter media 202 is readily pleated.

Figure 1A:
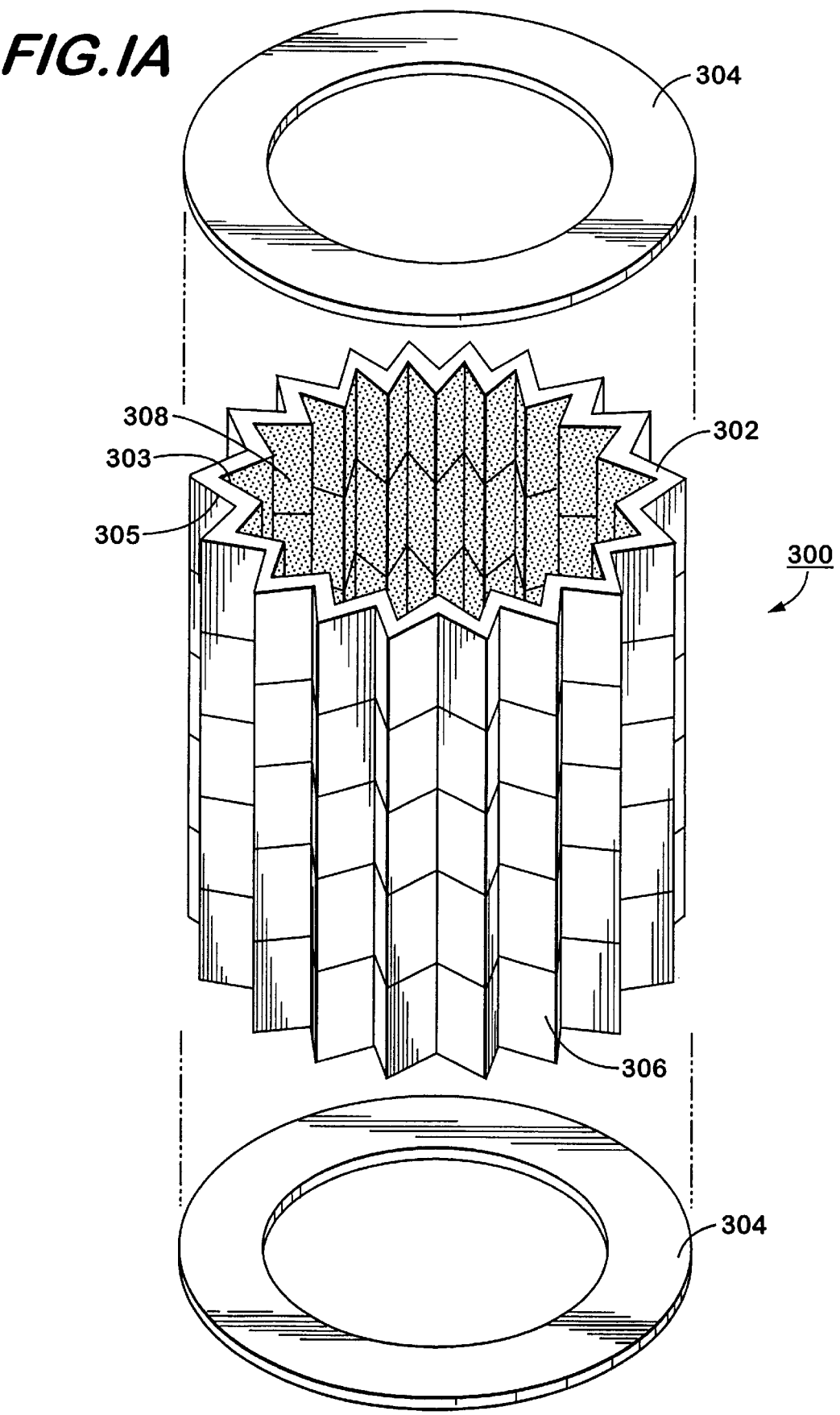
FIG. 1A is a perspective view of another embodiment of fiber bed mist elimination filter, particularly showing a pleated hydroentangled ECTFE copolymer filter media and its associated support structure.

Referring to FIG. 1A, a preferred embodiment of the present invention is shown having a pleated filter media. A pleated filter media configuration is preferred because greater surface area can be realized, promoting a more cost effective separation. Hydroentangled ECTFE copolymer filter media is pleated according to pleating methods well known in the art. As shown in FIG. 1A, the pleated fiber bed mist eliminator filter 300 is constructed from a pleated bed of hydroentangled ECTFE copolymer filter media 302 and a support structure. The filter media 302 has an inner wall 303 and an outer wall 305. The bed may comprise multiple layers of hydroentangled ECTFE copolymer. For purposes of illustration, only one layer is depicted. The support structure preferably includes two annular end plates 304, between which, the pleated filter media 302 is situated. The interface between the filter media 302 and the end plates 304 is sealed with a bonding compound (not shown). Typically, it is further desirable to incorporate screening material 306 between the layers of pleated hydroentangled filter media 302 to impart rigidity to the filter media side walls. Additionally, a perforated metal or plastic overwrap 308 might be placed inside the filter bed 302 along the inner wall 303 for purposes of imparting compressive strength to the fiber bed mist eliminator.

The bed of hydroentangled ECTFE copolymer filter media is generally constructed from material provided in the form of a sheet. The bed of hydroentangled ECTFE copolymer filter media 202 comprises at least one layer of hydroentangled ECTFE copolymer material, depending upon the thickness of the material used to construct the bed of filter media. The bed of hydroentangled ECTFE copolymer filter media 202 has a resulting thickness in the range of about ¼ in. to about 2 in., preferably from about ¼ in. to about 1 in. The bed of hydroentangled ECTFE copolymer filter media preferably has a bulk density in the range from about 28 lbs(mass)/ft$^3$ to about 33 lbs/ft$^3$.

Figure 2:
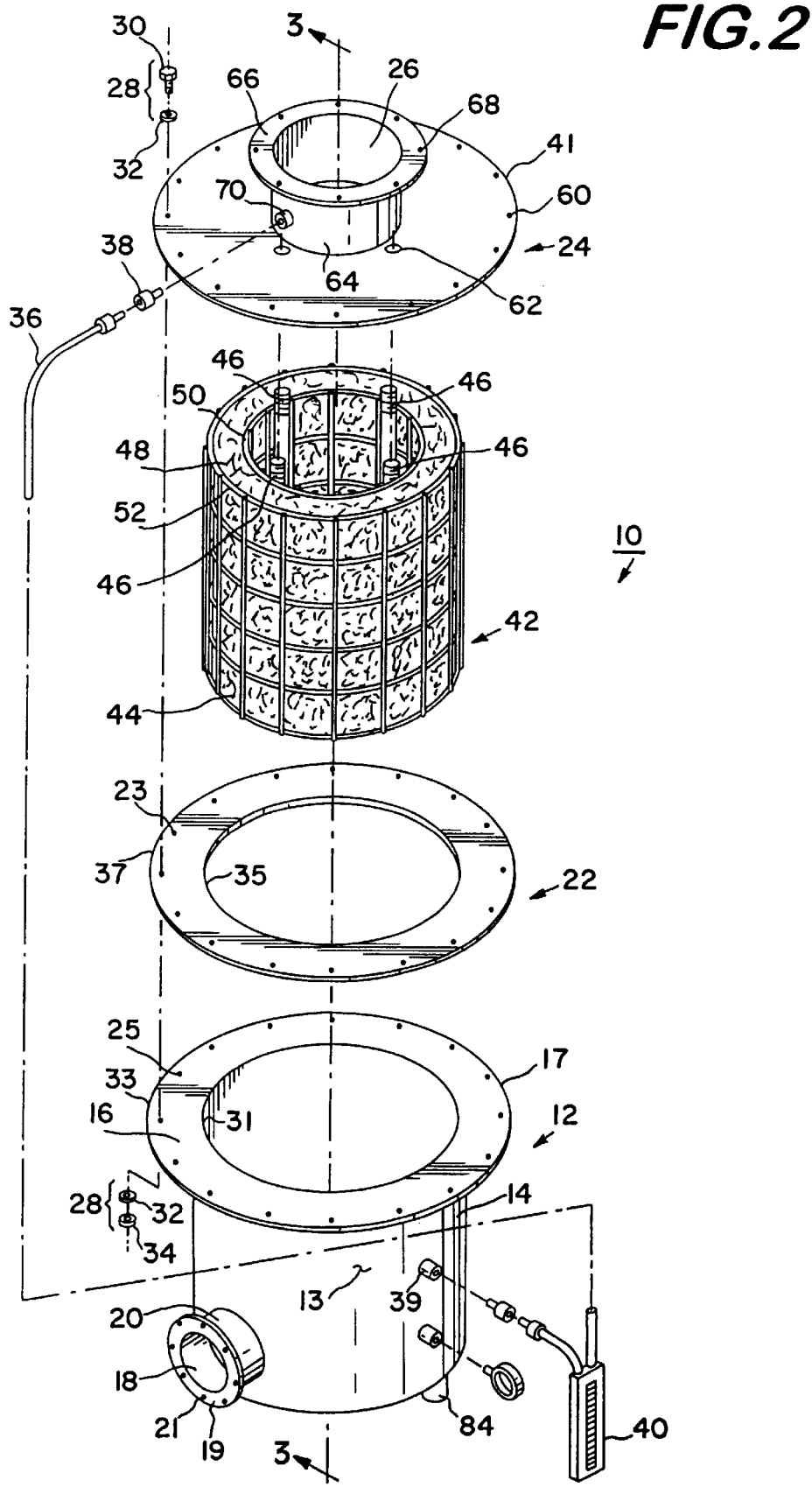
FIG. 2 is an exploded view of a fiber bed mist eliminator system which includes a hydroentangled ECTFE copolymer filter media contained within a housing according to one embodiment of the present invention.

Referring to FIG. 2, a fiber bed mist eliminator assembly is generally shown by the numeral 10. For purposes of illustration, a non-pleated fiber bed mist eliminator filter is depicted; a pleated filter may also be substituted in this assembly. The fiber bed mist eliminator assembly includes a filter housing 12, a gasket 22, a fiber bed mist eliminator filter 42, and a top plate 24. Filter housing 12 is a hollow vessel, preferably cylindrical, defined by a side plate 14, a bottom plate 15 (shown in FIG. 3), and a filter flange 17. The filter housing 12 is generally constructed of a material that is impervious to fluids and inert to the aerosols contained in the system. Examples of suitable materials are metals, plastics, or combinations thereof.

Side plate 14 is characterized by having an inner surface 11 (shown in FIG. 3) and an outer surface 13. Inner surface 11 and outer surface 13 define an inner circumference 27 and an outer circumference 29, respectively, (both shown in FIG. 3) of filter housing 12. Filter housing 12 further includes an inlet 18 defined by a conduit 20. Conduit 20 includes a flange 19 having a plurality of openings 21 for connecting a feedline (not shown) in known fashion to filter housing 12. Filter housing 12 still further includes a lower port 39 providing fluid communication between an interior region of filter housing 12 and a pressure indicator 40. The preferred method and equipment for monitoring the pressure and/or pressure drop through filtering housing 12 is described in greater detail below.

Filter flange 17 has an inner circumference 31 and an outer circumference 33. Filter flange 17 has a top surface 16, which radiates out from inner circumference 31 and beyond outer circumference 29 of filter housing 12. Filter flange 17 is oriented substantially perpendicular to side plate 14 of filter housing 12. Top surface 16 preferably has a width of between ½" and 2", more preferably about 1". Flange 17 has a thickness of between ⅛" to ¾", more preferably about ½", which is substantially the same thickness as side plate 14 and bottom plate 15. Filter flange 17 includes lower locking openings 25 that are spaced substantially equidistant around top surface 16 and through filter flange 17.

Gasket 22 has a generally circular shape with an inner circumference 35 and outer circumference 37. Inner circumference 35 of gasket 22 substantially corresponds with inner circumference 31 of filter housing 12. Outer circumference 37 of gasket 22 substantially corresponds with outer circumference 33 of top surface 16. Gasket 22 is provided with middle openings 23 that substantially correspond with lower locking openings 25 provided through filter flange 17. Gasket 22 is preferably prepared from a rubbery composition having sufficient flexibility, compressibility, and imperviousness to form an air and water (liquid and gas) tight seal between adjoining parts, such as filter housing 12 and top plate 24.

Fiber bed mist eliminator filter 42 includes a layer of hydroentangled ECTFE copolymer filter media 48 and a support structure. The support structure includes an inner cage 50, and an outer cage 52. A base plate 44, and a plurality of upstanding rods 46 are preferably also included in the support structure. The support structure contains and supports the filter media 48. The characteristics of hydroentangled ECTFE copolymer filter media 48 will be described in more detail below.

Top plate 24 includes an outlet 26, a plurality of top locking openings 60, and a plurality of stabilizing openings 62. Top plate 24 has an outer circumference 41 that substantially corresponds with outer circumference 37 of gasket 22 and outer circumference 33 of top surface 16. Top locking openings 60 are provided substantially equidistant along outer circumference 41 of top plate 24 and substantially correspond with lower locking openings 25 of top surface 16 and middle openings 23 of gasket 22. Stabilizing openings 62 are located radially inward of top locking openings 60.

Outlet 26 of top plate 24 is defined by an upward section 64 and flange section 66. Flange section 66 is provided with openings 68 analogous to openings 21 of inlet 18. A port 70 is provided through upward section 64. Port 70 is designed to receive a connector 38, which is then optionally connected to a pressure line 36. Pressure line 36 may be connected to pressure indicator 40 in conventional fashion.

Pressure indicator 40 is of conventional construction and may be adapted to monitor the pressure in fiber bed mist eliminator assembly 10 or the pressure drop through hydroentangled ECTFE copolymer filter media 48. Preferably, the pressure drop through hydroentangled ECTFE copolymer filter media 48 is no greater than 30 inches of water column. More preferably, the pressure drop through hydroentangled ECTFE copolymer filter media 48 is between 2 inches and 20 inches of water column.

The fiber bed mist eliminator assembly 10 may be assembled as follows. Fiber bed mist eliminator filter 42 is placed in the filter housing 12 with base plate 44 resting on bottom plate 15 of filter housing 12. Gasket 22 is then placed on top surface 16 of filter flange 17 such that middle openings 23 correspond with lower locking openings 25 of filter flange 17. Top plate 24 is then placed on gasket 22 and top surface 16 such that top locking openings 60 correspond with middle openings 23 of gasket 22 and lower locking openings 25 of filter flange 17. Furthermore, upstanding rods 46 extend upward and through stabilizing openings 62. A portion of upstanding rods 46 extending above top plate 24 may be threaded to allow the addition of a fastener, such as an internally threaded bolt.

In order to securely close the fiber bed mist eliminator assembly 10, a plurality of locking assemblies 28, such as a threaded nut 30, a washer 32, and an internally threaded bolt 34, may be provided through top locking openings 60, middle openings 23, and lower locking openings 25 in known fashion. Threaded nut 30 may be freely removable from or affixed by welding or other well known mechanisms to filter vessel 10. Alternate mounting arrangements for attaching the various elements of the fiber bed mist eliminator assembly 10 are well known in the art and need not be described further.

Figure 3:
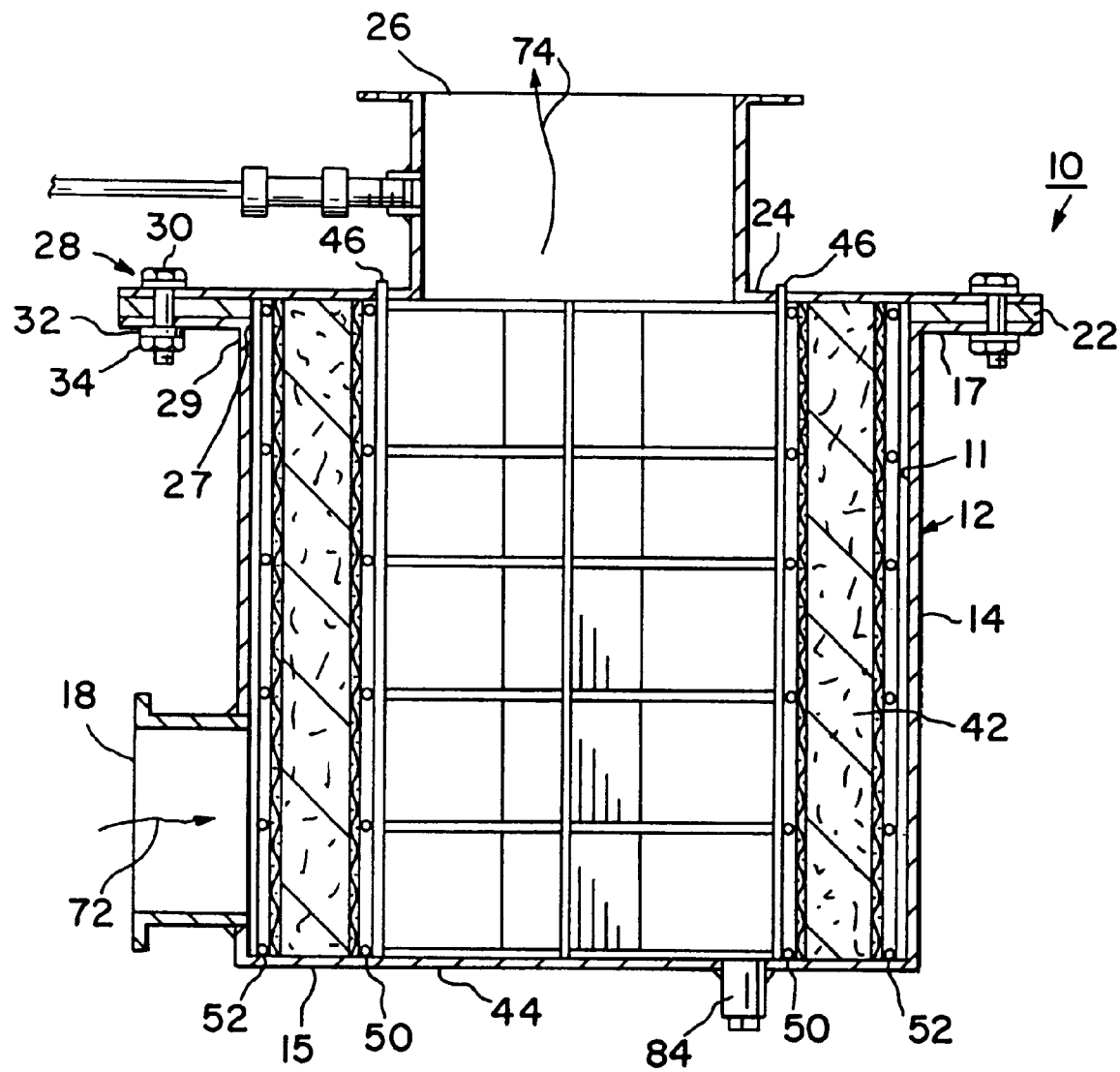
FIG. 3 is a cross-sectional view of the fiber bed mist eliminator system taken along lines 3—3 in FIG. 2.

A cross-sectional view of an enclosed fiber bed mist eliminator assembly 10 is shown in FIG. 3. It can be seen that base plate 44 rests on bottom plate 15 and that top plate 24 is in abutting engagement with fiber bed mist eliminator filter 42. Accordingly, a process stream containing an aerosol 72 entering filter vessel 10 through inlet 18 must pass through the fiber bed mist eliminator filter 42 prior to exiting the filter housing 12 through outlet 26 as a treated gas 74. This particular flow pattern is known in the industry as an "outside-in" flow. One skilled in the art will immediately recognize that the direction of flow of the gas stream may be reversed to produce an "inside-out" flow pattern. Either flow pattern may be used to practice the present invention for removing aerosols from a gas stream. As aerosol-laden gas 72 passes through the fiber bed mist eliminator filter 42, aerosols coalesce into liquid droplets which fall by gravity towards bottom plate 15. The resulting droplets are removed from filter housing 12 through a drain 84.

The fiber bed mist eliminator filter 42 preferably sandwiches the fibers of hydroentangled ECTFE copolymer filter media 48 between support structure, such as the outer cage 52 and the inner cage 50. These cages can be made from any suitable material which is capable of supporting the fibers of hydroentangled ECTFE copolymer filter media 48 in a substantially stationary position. It is also presently preferred that the material from which cages 50 and 52 are made is inert relative to the airstream and aerosols contained therein during operation. Examples of suitable materials from which outer cage 52 and inner cage 50 can be prepared include, but are not limited to, plastic, metal, and/or mixtures thereof.

For purposes of illustration, in the fiber bed mist eliminator assembly 10, the hydroentangled ECTFE copolymer filter media 48 is further stabilized by upstanding rods 46 which extend from base plate 44 through top plate 24. This can best be seen in FIG. 3. It is also contemplated that the rods need not extend to the base of the cage. Instead, the rods can simply be welded (or otherwise attached) at or near the top of the cage. In one embodiment, the rods can be bolts or threaded studs which are welded to the inside of the cage. Various other means for securing and stabilizing hydroentangled ECTFE copolymer filter media can be practiced within the scope of this invention and would be readily appreciated by those skilled in the art. For example, cross members can be extend across the width of filter housing 12 and engage the sides of the filter media. Still other means include the use of rods extending through top plate 24 of filter housing 12 into hydroentangled ECTFE copolymer filter media 48. In yet another embodiment, the support structure may comprise annular rings or bands which mount to the terminal ends of the filter media. The annular rings include inner and outer concentric ring flanges which engage the inner and outer surfaces of the filter media, respectively.

Referring to FIG. 3, in operation, a contaminated gas stream, such a process stream containing an aerosol 72 is introduced into the fiber bed mist eliminator assembly 10 through inlet 18. As the contaminated gas passes through the fiber bed mist eliminator filter 42, the hydroentangled ECTFE copolymer fiber media 48 causes the liquid contained within the gas stream to coalesce on the walls and within the fiber media 48. The liquid eventually drains downward along the walls to the base of the fiber bed mist eliminator filter 42 where it is channeled away. The rate at which process stream 72 flows into fiber mist eliminator assembly 10 must not cause re-entrainment of aerosols collected by hydroentangled ECTFE copolymer filter media 48.

When practicing the present invention, the velocity at which gas stream 72 flows through the hydroentangled ECTFE copolymer filter media 48 should also be less than that which results in re-entrainment of collected aerosols. The velocity of gas stream 72 through hydroentangled ECTFE copolymer filter media 48 is any rate less than about 200 feet per minute. While there is no lower limit, for practical purposes, the velocity of the gas stream passing through hydroentangled ECTFE copolymer filter media 48 should be greater than about one foot per minute. Preferably, the velocity ranges from about 10 to about 200 feet per minute, more preferably from about 20 to about 100 feet per minute, most preferably, about 30 feet per minute.

The flow rate of gas stream 72 through the fiber bed mist eliminator assembly 10 may be controlled by manipulating many different parameters. For example, if all other factors are held constant, the flow rate of a gas stream through hydroentangled ECTFE copolymer filter media 48 may be decreased by increasing the hydroentangled ECTFE copolymer fiber media 48 surface area. The surface area of hydroentangled ECTFE copolymer filter media 48 can be increased by: 1) increasing the number of fiber bed mist eliminator filters 42; or 2) increasing the size of the individual hydroentangled ECTFE copolymer filter media 48; or (3) pleating the filter media.

In an alternate embodiment (not shown) two or more hydroentangled ECTFE copolymer filter media may be concentrically mounted within a single housing, preferably with an air passage between the two filters, such as disclosed in U.S. Pat. No. 4,948,398, the entire disclosure of which is incorporated by reference. The contaminated flow is channeled appropriately so as to pass through at least one of the hydroentangled ECTFE copolymer filter media.

Figure 4:
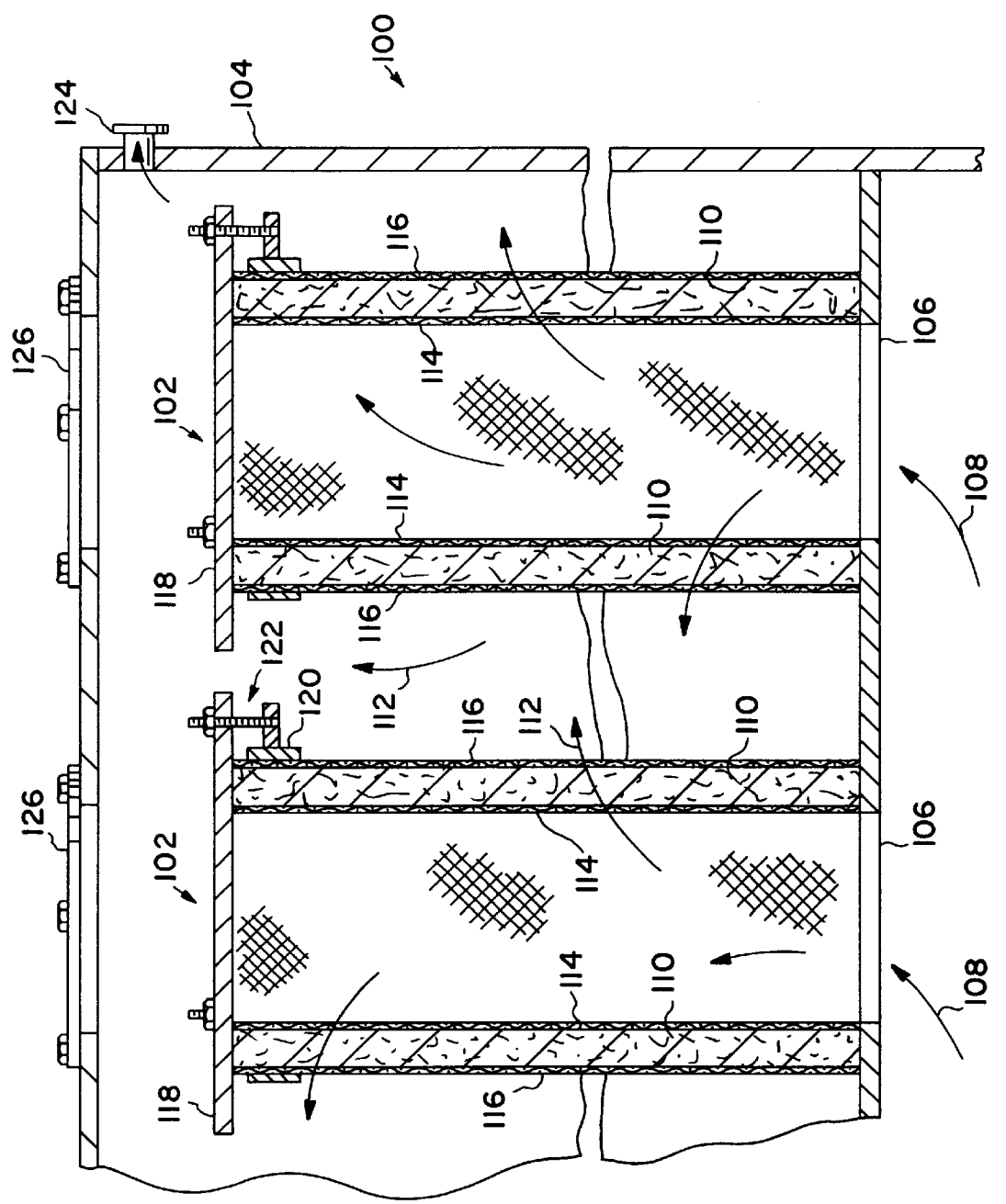
FIG. 4 is a cross-sectional view of a second embodiment of a fiber bed mist eliminator system showing two fiber bed mist eliminator filters mounted within a common vessel.

Referring to FIG. 4, an alternate embodiment of a fiber bed mist eliminator system 100 is shown. In this embodiment, a plurality of fiber bed mist eliminator filters 102 are mounted in an array within a single vessel 104. The vessel 104 is only partially illustrated for the sake of simplicity. The vessel 104 includes one or more inlet openings 106 formed through a wall of the vessel 104. Preferably at least one inlet opening 106 is located in the vicinity of each fiber bed mist eliminator filter 102 so as to permit flow of the contaminated gas stream 108 into the hydroentangled ECTFE copolymer filter media 110. In the illustrated embodiment, there are two fiber bed mist eliminator filters 102 mounted parallel to and spaced apart from one another. The spacing is intended to permit filtered air 112 to pass between the fiber bed mist eliminator filters 102.

The fiber bed mist eliminator filters 102 include a hydroentangled ECTFE copolymer fiber media 110 contained within a support structure. In the illustrated embodiment, the support structure includes inner and outer cage or mesh members 114, 116. If desired, the support structure can be attached or engaged to the fiber media 110 by any suitable means known to those skilled in the art. A top plate 118 may be attached to the hydroentangled ECTFE copolymer filter media 110 or the support structure. In the illustrated configuration, the top plate 118 is attached to the outer cage member 116 through a ring 120 and a bolted flange 122. Various alternate mounting methods can be practiced within the purview of the claims and need not be discussed in any more detail. The attachment of the fiber bed mist eliminator filters 102 to the vessel 104 is not shown for clarity but can be made in a similar manner as discussed hereinabove with respect to the previous embodiment. Alternately, the support structure may be attached to the vessel 104.

The vessel 104 also includes an outlet port 124 which permits the combined filtered flows 112 from the fiber bed mist eliminator filters 102 to exit out of the vessel 104. Access doors 126 may be removably attached to the vessel 104 at desired locations so as to permit entry into the vessel 104 for inspecting, maintaining, and/or replacing the fiber bed mist eliminator filters 102.

The utilization of a plurality of fiber mist eliminator elements 102 within a single vessel 104 improves the overall system filtering efficiency by increasing the quantity of aerosols removed from a contaminated gas stream, such as a process stream containing a aerosol. The added number of fiber bed mist eliminator filters 102 also increases the volumetric throughput of an the contaminated gas stream through the fiber bed mist eliminator system.

Another embodiment of a fiber bed mist eliminator, as described in commonly assigned, copending application Ser. No. 08/479,377, filed Jun. 7, 1995, now U.S. Pat. No. 5,730,786 the entire disclosure of which is incorporated herein by reference. In such embodiment, a plurality of fiber bed mist eliminator assemblies are mounted to a common drainage sump.

Alternate media shapes and configurations are also contemplated and well within the purview of this invention. For example, a flat or planar fiber bed mist eliminator filter can be formed from a substantially flat or planar piece of hydroentangled ECTFE copolymer filter media contained within a suitable support structure. This type of fiber bed mist eliminator filter would be used in a fiber bed mist eliminator system which currently utilizes flat fiber filters. The hydroentangled ECTFE filter media may also be shaped in a tubular or polygonal fashion.

The hydroentangled ECTFE copolymer fiber bed of the present invention provides several advantages over currently available separation media used in fiber bed mist eliminator applications, particularly in acidic mist separations.

The hydroentangled ECTFE copolymer media permits a more effective separation than fiberglass and an equivalent or better separation effectiveness than non-hydroentangled media. The hydroentangled material can be pleated, whereas fiberglass fiber beds of greater than or equal to about one-inch thickness cannot. Pleating the separation media can increase its effective surface area by a factor several times greater than a similarly-sized filter. Also, ECTFE copolymer has a wider chemical resistivity than fiberglass. In particular, the ECTFE copolymer is resistant to acidic corrosion and the hydrolytic effects of water. The fluoropolymer fibers also maintain their desirable properties over a temperature range sufficient for the contemplated mist eliminator applications.

The attributes of the present invention are illustrated in the examples below. In all the examples below and unless otherwise specified therein, a fiber bed mist eliminator was utilized having a generally cylindrical-shaped fiber bed having an outside diameter of 16 in., an inside diameter of 12 in. and a length of 28 in. (16" od×12" id×28"). The inlet duct had a diameter of 16 in. The filter bed was positioned in a vertical fashion. Fluid flow through the filter was inside/out. The application of this invention is independent of mist eliminator design, as hydroentangled fluoropolymer media may be utilized in any fiber bed mist eliminator.

The nozzle employed to introduce water into the fiber bed was a Bete type PJ-15, rated at 0.037 gpm at 40 psig. A standard rotameter is used to measure the flow rate of fluid through the inlet duct. In those applications involving the introduction of wet conditions, the nozzle atomized water into the fiber bed at the point the inlet duct opened into the inner periphery of the fiber bed.

Mist was introduced into the process stream entering the fiber bed as the source of colloidal particulates. The mist was generated by the controlled heating of glycol. Concentration of mist in the process stream was measured with a mist opacity meter. The concentration of mist in the inlet and outlet stream of the mist eliminator was expressed as a percentage opacity. The concentration of mist in the outlet stream was sometimes described in qualitative terms, such as "heavy" or "light". A determination of "very light," for example, corresponds to a measured concentration of mist less than 5% and is considered more than satisfactory for industrial applications.

The ECTFE copolymer mat employed was manufactured by Ausimont USA, under the trade name HALAR. Specifically, a melt blown nonhydroentangled material (HALAR MBF) and a melt blown hydroentangled material (HALAR MBFII) were used as fiber bed materials. The fluoropolymer materials are available in densities of 3 oz/yd$^2$ or 12 oz/yd$^2$. Unless specified otherwise, fluoropolymer mats of 12 oz/yd$^2$ were used in the tests. A layer of the commercially available fluoropolymer material is approximately 1/16 inch thickness. Tests were initially conducted under wet and dry conditions for both the non-hydroentangled and hydroentangled materials using 4, 5, and 6 layers of the commercially available materials in a fiber bed. A six-layer fiber bed of the 1/16 inch thickness was deemed the preferred amount of separation material based on considerations of pressure drop and separation effectiveness. Thus, all the examples below utilize fiber beds having 6 layers of the ECTFE material. HALAR MBF has a fiber diameter in the range of about 4 microns to about 7 microns. Fiberglass was also used for purposes of comparison.

In the examples, the following measured values, as defined herein, are employed. The pressure across the filter bed (ΔP) is calculated with the use of a standard, commercially available manometer employing a liquid (water) column gauge. The pressure across the fiber bed is measured as inches of water in the column.

Duct velocity (ft./min.) is defined as the velocity of a gaseous stream passing through the duct entering the fiber beds. It is calculated by dividing the volumetric flow rate of the inlet stream ($ft^3$/min.) into the cross sectional area ($ft^2$) of the inlet duct.

Volumetric flow rate ($ft^3$/min.) is the quantity of air or process stream fluid delivered to the fiber bed through the inlet duct.

Surface velocity (ft./min.) is defined as the velocity of gaseous stream entering the fiber bed at the interior periphery of the fiber bed; it is calculated by dividing the volumetric flow rate by the lateral surface area of the inner periphery of the fiber bed. Calculation of the surface velocity permits comparisons between filters of differing dimension or geometry, as well as variable volumetric flow rates.

EXAMPLE 1

Tests were conducted to compare the performance of hydroentangled ECTFE copolymer fibers to non-hydroentangled ECTFE copolymer in a fiber bed mist eliminator application under dry conditions. Air was blown through the fiber bed. That is, the fiber bed was tested without the introduction of a liquid mist.

A non-pleated non-hydroentangled ECTFE copolymer fiber bed was constructed measuring 24" od×20" id×5 ft long and incorporating six layers of 12 oz/$yd^2$ material. The inside surface area of the filter was 26.1 $ft^2$. A fiber-bed was also constructed with non-pleated hydroentangled ECTFE copolymer media measuring 16" od×12" id×28" length. The effective inside surface area of this filter was 6.26 $ft^2$, discounting the surface area under two bands on the inner cage holding the material in place. The results are shown in Tables 1 and 2.

TABLE 1

Non-hydroentangled ECTFE copolymer media.

| Vol. flow rate ($ft^3$/min) | Surface Vel. (ft/min) | ΔP (in water) | Mist In (%) | Mist Out (%) |
|---|---|---|---|---|
| 2009 | 76.8 | 18.9 | ND* | ND |
| 1850 | 70.7 | 17.8 | ND | ND |
| 1421 | 54.3 | 13.0 | ND | ND |
| 702 | 26.9 | 7.1 | ND | ND |
| 754 | 28.8 | 7.2 | 65 | Very light |
| 754 | 28.8 | 7.2 | 30 | 0 |

* ND = Not done.

TABLE 2

Hydroentangled ECTFE copolymer media.

| Vol. flow rate ($ft^3$/min) | Surface Vel. (ft/min) | ΔP (in water) | Mist In (%) | Mist Out (%) |
|---|---|---|---|---|
| 206.8 | 33.0 | 4.7 | 80 | 1–2 |
| 326.1 | 52.1 | 7.0 | 80 | 4–5 |
| 396.7 | 63.4 | 8.5 | 80 | 6–7 |

At commensurate surface velocities, the hydroentangled fiber bed caused lower pressure drops than the non-hydroentangled material. Under dry conditions, there is a linear relationship between pressure drop access the fiber bed and surface velocity. Thus, at a given surface velocity, the hydroentangled fiber bed enabled an approximate 50% lower pressure drop. Separation data was not acquired for the non-hydroentangled material at all surface velocities. Both materials exhibited effective separation efficiencies, as evidenced by the mist data. However, the hydroentangled ECTFE copolymer material accomplished an equivalent or better separation at about one-half the pressure drop.

EXAMPLE 2

Tests were conducted to compare the pressure-drop performance of a hydroentangled ECTFE copolymer mat to standard 8 μm fiberglass fibers in a fiber bed mist eliminator application under dry conditions. The data obtained for the hydroentangled ECTFE copolymer material is that collected as described in Example 1. The fiberglass filter bed material data was derived from a standard curve constructed from data collected from many applications, thus allowing direct comparison of surface velocity values. The results are shown in Tables 3 and 4.

TABLE 3

Hydroentangled ECTFE copolymer media.

| Surface velocity (ft/min) | ΔP (in. water) |
|---|---|
| 33.0 | 4.7 |
| 52.1 | 7.0 |
| 63.4 | 8.5 |

TABLE 4

Fiberglass media.

| Surface Velocity (ft/min) | ΔP (in. water) |
|---|---|
| 33.0 | 6.6 |
| 52.1 | 10.4 |
| 63.4 | 12.7 |

The hydroentangled fluoropolymer material exhibited approximately 40–48% lower pressure drop across the fiber bed than the fiberglass material.

EXAMPLE 3

Tests were conducted to compare the pressure drop performance of hydroentangled ECTFE copolymer fibers to standard 8 μm fiberglass in a fiber bed mist eliminator application under wet conditions. The hydroentangled ECTFE copolymer fiber bed was constructed as set forth in Example 1. Water was introduced to the hydroentangled fiber bed at a rate of 0.25 gpm for 5 minutes. Data was collected after the water was shut off. The fiberglass filter bed data was acquired from a standard curve obtained for a saturated fiberglass filter material having a density of 150 mg/$ft^3$. The results are shown in Tables 5 and 6.

TABLE 5

Hydroentangled ECTFE copolymer media.

| Vol. flow rate ($ft^3$/min.) | Surface Vel. (ft/min.) | ΔP (in. water) |
|---|---|---|
| 370 | 59.1 | 9.6 |
| 399 | 63.7 | 9.0 |
| 418 | 66.8 | 8.6 |
| 461 | 73.6 | 7.4 |

TABLE 6

Fiberglass media.

| Surface Velocity (ft/min.) | ΔP (in. water) |
|---|---|
| 30 | 15.6 |
| 45 | 23.4 |
| 60 | 31.2 |
| 70 | 36.4 |

The hydroentangled ECTFE copolymer fiber bed exhibited substantially lower pressure drops than standard fiberglass media, at commensurate surface velocities.

EXAMPLE 4

Tests were conducted to compare the performance of pleated hydroentangled ECTFE copolymer fibers to non-pleated hydroentangled ECTFE copolymer fibers in a fiber bed mist eliminator application under dry conditions. The data for the performance of non-pleated hydroentangled ECTFE copolymer media was collected as set forth in Example 1. The filter constructed with pleated hydroentangled ECTFE copolymer fiber bed media had dimensions of 16" od×12" id×16" length. The filter bed was positioned in a vertical fashion. The pleated fiber bed contained 6 layers of hydroentangled ECTFE copolymer material. The filter had 38 pleats and an approximate inner surface area of 14 ft$^2$. Pleating increases the effective surface area by an approximate factor of 3. The results are shown in Tables 7 and 8.

TABLE 7

Pleated hydroentangled ECTFE copolymer media.

| Vol. flow rate (ft$^3$/min) | Surface Velocity (ft/min) | ΔP (in. water) | Mist In (%) | Mist Out (%) |
|---|---|---|---|---|
| 516.6 | 36.9 | 6.0 | 60 | 1–2 |
| 513.8 | 36.7 | 6.0 | 60 | 1–2 |

TABLE 8

Non-pleated hydroentangled ECTFE copolymer media.

| Vol. flow rate (ft$^3$/min) | Surface Velocity (ft/min) | ΔP (in. water) | Mist In (%) | Mist Out (%) |
|---|---|---|---|---|
| 206.8 | 33.0 | 4.7 | 80 | 1–2 |
| 326.1 | 52.1 | 7.0 | 80 | 4–5 |
| 396.7 | 63.4 | 8.5 | 80 | 6–7 |

The pleated and non-pleated hydroentangled ECTFE copolymer performed equally well. The pressure drop data was approximately equivalent within experimental error. Therefore, it is expected that hydroentangled ECTFE copolymer fiber bed material can be pleated for increased surface area while minimally, if at all, sacrificing pressure drop across the fiber bed.

EXAMPLE 5

Tests were conducted to compare the performance of hydroentangled ECTFE copolymer fibers to non-hydroentangled ECTFE copolymer fibers in a fiber bed mist eliminator application under wet conditions. The data for the hydroentangled ECTFE copolymer material was collected as set forth in Example 3. The non-hydroentangled fiber bed filter was constructed having dimensions of 24" od×20" id×5' length. Six layers of 12 oz/yd$^2$ non-hydroentangled material were used in the filter bed. The effective inner surface area of the filter bed was 26.1 ft$^2$. The filter was vertically situated. Water was introduced to the filter by a nozzle placed at the back plate to spray the interior of the filter countercurrent to the air flow. The results are shown in Table 9 and 10.

TABLE 9

Hydroentangled ECTFE copolymer media.

| Vol. flow rate (ft$^3$/min.) | Surface Vel. (ft/min.) | ΔP (in. water) | Mist In (%) | Mist Out (%) |
|---|---|---|---|---|
| 370 | 59.1 | 9.6 | 55 | 5 |
| 399 | 63.7 | 9.0 | 55 | 5 |
| 418 | 66.8 | 8.6 | 55 | 6 |
| 461 | 73.6 | 7.4 | 55 | 6 |

TABLE 10

Non-hydroentangled ECTFE copolymer media

| Volumetric flow rate (ft$^3$/min) | Surface Velocity (ft/min) | ΔP (in water) |
|---|---|---|
| 699 | 26.7 | 7.4 |
| 597 | 22.8 | 10.2 |
| 505 | 19.2 | 11.4 |
| 96 | 3.7 | 16.0 |

The pressure drop across the fiber bed of the hydroentangled ECTFE copolymer material was lower than that for the non-hydroentangled material. The non-hydroentangled fluoropolymer filter bed became saturated and the pressure drop became excessive.

It is further understood that the present invention is not limited to the particular embodiments shown and described herein, but that various changes and modifications may be made without departing from the scope and spirit of the invention.

What is claimed is:

1. A fiber bed mist eliminator filter comprising a fiber bed separation media contained within a support structure, the fiber bed separation media comprising at least one layer of non-woven ethylene/chlorotrifluoroethylene copolymer fibers wherein the ethylene/chlorotrifluoroethylene copolymer fibers are hydroentangled.

2. A fiber bed mist eliminator filter as in claim 1, wherein the support structure comprises an inner cage and an outer cage surrounding the fiber bed separation media.

3. A fiber bed mist eliminator assembly comprising
a) a filter vessel having an inlet and an outlet, the inlet adapted to direct a fluidized process stream containing an aerosol into the vessel, the outlet adapted to direct a substantially aerosol-free gas stream out of the vessel, the vessel adapted to direct a gas stream flow from the inlet to the outlet; and
b) at least one fiber bed mist eliminator filter contained within the enclosed filter vessel and positioned between the inlet and the outlet within the flow of the process stream, the fiber bed mist eliminator filter comprising at least one non-woven layer of ethylene/chlorotrifluoroethylene copolymer fibers, wherein the ethylene/chlorotrifluoroethylene copolymer fibers are hydroentangled.

4. A fiber bed mist eliminator as in claim 3, wherein the layer of ethylene/chlorotrifluoroethylene fibers is pleated.

5. A fiber bed mist eliminator as in claim 3, wherein the ethylene/chlorotrifluoroethylene copolymer fibers have a fiber diameter in the range from about 4 microns to about 7 microns.

6. A fiber bed mist eliminator as in claim 4, wherein the ethylene/chlorotrifluoroethylene copolymer fibers have a fiber diameter in the range from about 4 microns to about 7 microns.

7. A mist elimination process for the substantial removal of aerosols entrained in a moving process stream, the process comprising the steps of:

a) introducing the moving process stream containing an aerosol into a fiber bed mist eliminator filter and passing the process stream containing an aerosol through a hydroentangled ethylene/chlorotrifluoroethylene copolymer fiber bed separation media in the fiber bed mist eliminator filter to produce a treated gas.

* * * * *